United States Patent Office 3,274,227
Patented Sept. 20, 1966

3,274,227
TRIHALOMETHYLATION OF POLARIZED DOUBLE BONDS
Heinz G. Viehe, Beersel-Linkebeek, Belgium, assignor to Union Carbide Corporation, a corporation of New York
No Drawing. Filed June 12, 1962, Ser. No. 201,766
10 Claims. (Cl. 260—465)

This invention relates to condensation reactions. More particularly, this invention relates to a method for promoting addition of halogenated alkyl groups to organic compounds having a polarized double bond.

Base-catalyzed condensation reactions of some organic compounds containing a polarized double bond are known in the art. More specifically, it is known that trichloromethane can be added to a ketone in the presence of molar amounts of a strong alkali metal base to give a halogenated alcohol. The reaction involves an intermediate step whereby an alkali metal alkoxide is formed which is then treated with a strong acid to give the corresponding halogenated alcohol. Schematically such reaction can be represented as follows:

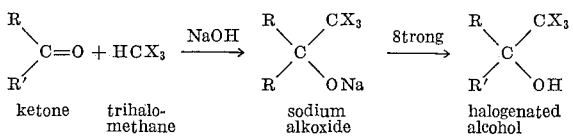

These known prior art processes are plagued by low yields and extremly long reaction times which usually are of the order of hours. Moreover, large amounts of a strong base are required and the reaction medium must be anhydrous. Furthermore, in some instances the recovery of the reaction products is so difficult that recovery of a pure product involves the use of large amounts of a strong acid and tedious processing.

Compounds prepared by the aforesaid processes have found considerable utility because of their pharmaceutical properties. Trihalomethyl alcohols, for example, are known to be effective antiseptics, antispasmodics, and hypnotics. The trichloromethylated compounds are known to have insecticidal, bactericidal, and pesticidal properties.

It is an object of the present invention to obviate the difficulties encountered in the preparation of the aforesaid compounds and to provide a method for carrying out condensation reaction whereby the reaction product yield is substantially increased It is another object to provide a method whereby the reaction time is materially decreased.

It is a further object to provide a method whereby the condensation reaction products can be readily recovered from the reaction product mixture in a substantially pure state.

It is a still further object to provide a method for carrying out a condensation reaction which requires the presence of a strong base only in catalytically significant amounts.

These and other related objects will become readily apparent from the ensuing discussion and the appended claims.

The aforesaid objects are achieved by reacting trihalomethane with an organic compound having at least one polarized double bond in a basic polar solvent at a temperature below about $-10°$ C. and in the presence of a catalytically significant amount of a strong base.

By the term "trihalomethane" as used herein and in the appended claims is meant methane which has three hydrogen atoms replaced by halogen atoms, i.e., chlorine, bromine, and iodine. The hydrogen atoms may be replaced by one particular halogen as in trichloromethane, tribromomethane, and triiodomethane, or the hydrogen atoms may be replaced by different halogens as in dichlorobromomethane, chlorodibromomethane, dichloroiodomethane, dibromoiodomethane, and the like.

By the term "organic compound having at least one polarized double bond" as used herein and in the appended claims is contemplated an organic compound having within its molecular structure a bond between two adjacent atoms that causes the grouping of these two atoms to have a nucleophilic center and an electrophilic center. The nucleophilic center is characterized by a relatively higher electron density and the electrophilic center is characterized by a relatively lower electron density.

Typical of such groupings is the carbonyl grouping wherein a nucleophilic center exists on the oxygen atom and an electrophilic center exists on the carbon atom. Other groupings comprise an activated carbon-to-carbon double bond wherein a bond of partially ionic character is situated adjacent to said carbon-to-carbon double bond and polarizes said double bond. Typical activated carbon-to-carbon double bonds are the $\alpha,\beta$-double bonds of unsaturated carboxylic acid esters and unsaturated nitriles.

Representative compounds within the above definition are the aldehydes, i.e., formaldehyde, acetaldehyde, glyoxal, propionaldehyde, n-butyraldehyde, isobutyraldehyde, n-valeraldehyde, isovaleraldehyde, n-caproaldehyde, acrolein, crotonaldehyde, benzaldehyde, furfural, and the like; the ketones, i.e., acetone, methyl ethyl ketone, methyl n-propyl ketone, diethyl ketone, hexanone-2, hexanone-3, methyl t-butyl ketone, di-n-propyl ketone, diisopropyl ketone, diisobutyl ketone, acetyl acetone, mesityl oxide, cyclopentanone, cyclohexanone, benzophenone, and the like; the $\alpha,\beta$-unsaturated carboxylic acid esters, i.e., methyl acrylate, methyl methacrylate, ethyl acrylate, methyl crotonate, ethyl crotonate, methyl cinnamate, and the like; and the $\alpha,\beta$-unsaturated nitriles, i.e., acrylonitrile, crotononitrile, cinnomonitrile, $\alpha$-methylacrylonitrile, $\alpha$-methylcrotononitrile, and the like.

By the term "polar solvent" as used herein and in the appended claims is meant a solvent the molecules of which have unshared electron pairs, which is at least slightly basic, and which exists in the liquid state at reaction temperatures, i.e., below $-10°$ C.

Representative solvents within the above definition are liquid ammonia; the primary amines, i.e., methyl amine, ethyl amine; the secondary amines, i.e., dimethyl amine, diethylamine; and the like. Liquid ammonia is the preferred solvent.

Catalysts contemplated by the method of the present invention are strong inorganic bases such as alkali metal hydroxide, i.e., lithium hydroxide, sodium hydroxide, potassium hydroxide, rubidium hydroxide, and cesium hydroxide; alkali earth metal hydroxide, i.e., calcium hydroxide, barium hydroxide, and strontium hydroxide; alkali metal amide, i.e., lithium amide, sodium amide, potassium amide, and the like; and alkali earth metal amide, i.e., aclcium amide, barium amide, and strontium amide.

Also suitable as catalysts are strong organic bases such as alkali metal alkoxide, i.e., sodium methoxide, sodium ethoxide, potassium methoxide, potassium ethoxide, lithium methoxide, lithium ethoxide, and the like.

The catalyst may be added to the reaction system along with the reactants or it may be prepared in situ. The latter can be conveniently accomplished with the alkali metal hydroxides and the alkali metal alkoxides by charging to the reaction vessel containing the solvent the desired alkali metal and suitable amounts of water or alcohol. At any rate a wide distribution of the catalyst through the reaction mass is desirable so as to maximize the contact area.

The catalysts contemplated in the method of the present invention are employed in catalytically significant quantities. In general a catalyst concentration up to about 2 moles per mole of trihalomethane is suitable. A catalyst concentration in the range from about 0.01 to about 2 moles per mole of trihalomethane is preferred. For optimum results the particular catalyst employed, the nature of the reactants employed, the reaction conditions, and other factors will largely determine the desired catalyst concentration.

The condensation reactions within the purview of the inventive concept are carried out at a temperature below about $-10°$ C. Depending upon various factors such as the nature of the particular reactants, the catalyst employed, the concentration of the catalyst, the solvent employed, and the like, the reaction temperature can be as low as $-130°$ C. and lower. A reaction temperature in the range corresponding to that of the liquid state of ammonia at atmospheric pressure, i.e., from about $-33°$ C. to about $-78°$ C. is preferred.

The reaction time will vary depending on reaction temperature, concentration of the reactants, the catalyst employed, and other factors. The reaction time can be as short as 1 minute, or less, or as long as about 60 minutes, or more. A preferred reaction time is in the range from about 1 minute to about 15 minutes.

The reaction pressure is not critical for the purpose of the present invention. Pressures as low as about ½ atmosphere or as high as several atmospheres may be employed. For reasons of convenience atmospheric pressure is preferred.

The relative amounts of reactant charged to the reaction vessel can vary over a considerable range. A molar ratio of the organic compound having at least one polarized double bond to the trihalomethane of about 1:1 is preferred; however the ratio can vary from about 10:1 to about 1:10.

The reaction products can be reclaimed and purified, if necessary, by the conventional methods, i.e., crystallization, distillation, and the like.

The invention is further illustrated by the following examples.

Example I

To a 500 milliliter reaction flask equipped with a $CO_2$ cooler was charged 250 ml. of liquid ammonia. Sodium amide (0.1 mol) was prepared in situ by adding small pieces of metallic sodium along with some ferric nitrate to the liquid ammonia. The ferric nitrate was employed to catalyze the reaction between sodium and liquid ammonia. The reaction flask and its contents were maintained at about $-75°$ C. by means of a $CO_2$-acetone bath.

To the liquid ammonia containing the sodium amide then was added a mixture of trichloromethane (0.1 mol, 11.9 grams) and acetone (0.1 mol, 5.8 grams). The resulting reaction was permitted to continue for about 4 minutes. Thereafter the reaction product mixture was neutralized with 9 grams of ammonium chloride, and the liquid ammonia solvent evaporated. Diethyl ether was then added to the resulting residue. The resulting solution was filtered and subsequently the diethyl ether was evaporated from this solution. The remaining liquid was poured into water whereupon a crystalline precipitate was formed. This precipitate was then recovered by filtration and dried. The precipitate was identified as 2-trichloromethyl-2-propanol, obtained in 86 percent yield.

In an analogous manner additional condensation reactions between trichloromethane and acetone were carried out in which the catalyst, the amounts thereof, and the process temperature were varied. The process variables and results of these reactions are summarized in Table I below.

TABLE I

| Catalyst | Mol. ratio of reactants, A:B:C | Reaction time, minutes | Reaction Temp., ° C. | Yield percent |
|---|---|---|---|---|
| $NaNH_2$ (plus water) | 1:1:1 | 10 | About $-75$ | 79 |
| $NaNH_2$ | 0.1:1:1 | 5 | About $-75$ | 83.5 |
| $NaNH_2$ | 0.1:1:1 | 60 | About $-75$ | 82.5 |
| $NaNH_2$ | 0.1:1:1 | 5 | About $-35$ | 68 |
| $NaNH_2$ | 1:1:1 | 4 | About $-75$ | 86 |
| $NaNH_2$ | 1:1:1 | 4 | About $-35$ | 63 |
| $LiNH_2$ | 1:1:1 | 3 | About $-75$ | 83 |
| $KNH_2$ | 1:1:1 | 2 | About $-75$ | 79 |
| $Ca(NH_2)_2$ | 1:1:1 | 2 | About $-75$ | 61 |
| NaOH (granules) | 1:1:1 | 60 | About $-75$ | 94 |
| NaOH (in situ) | 1:1:1 | 10 | About $-75$ | 97.5 |
| NaOH (in situ) | 0.1:1:1 | 60 | About $-75$ | 95 |
| NaOH (in situ) | 0.02:1:1 | 5 | About $-75$ | 81.5 |
| NaOH (in situ) | 0.02:1:1 | 60 | About $-75$ | 82.5 |
| LiOH (in situ) | 0.02:1:1 | 15 | About $-75$ | 45.4 |
| Na methoxide (in situ) | 0.1:1:1 | 5 | About $-75$ | 86 |
| Na t-butoxide (in situ) | 1:1:1 | 5 | About $-75$ | 92 |

NOTE.—A=catalyst. B=trichloromethane. C=acetone.

Example II

To a 500 milliliter reaction flask equipped with a $CO_2$ cooler was charged about 250 ml. of liquid ammonia. Sodium amide (0.12 mol) was prepared in situ by adding small pieces of sodium metal along with some ferric nitrate to the liquid ammonia. The reaction flask and its contents were cooled to about $-75°$ C. and maintained at this temperature by means of a $CO_2$ acetone bath.

To the liquid ammonia containing sodium amide was charged a mixture of trichloromethane (0.4 mol, 47.8 grams) and cyclopentanone (0.1 mol, 8.4 grams). After the reaction had proceeded for about two minutes, ammonium chloride (9 grams) was added to the reaction product mixture to neutralize said product mixture. The liquid ammonia solvent was then evaporated. The resulting residue was dissolved in diethyl ether and the solution filtered. Diethyl ether was evaporated from the filtrate and the resulting residue was distilled at 116° C. and 22 mm. of Hg pressure. The distillate was identified as 1-trichloromethyl-1-cyclopentanol, obtained in 93 percent yield.

In an analogous manner trichloromethane was reacted with cyclohexanone, benzaldehyde, acrylonitrile and methyl-methacrylate. The reactants, reaction conditions and reaction results are summarized in Table II below.

TABLE II

| Catalyst | Reactants | Mol ratio of reactants, A:B:C | Reaction time, minutes | Reaction temperature, °C. | Product | Yield percent |
|---|---|---|---|---|---|---|
| NaNH$_2$ | Trichloromethane and cyclohexanone. | 1:3:1 | 2 | About −75 | 1-trichloromethyl-1-cyclohexanol | 74 |
| NaNH$_2$ | ----do---- | 1:1:1 | 3 | About −75 | ----do---- | 21 |
| NaOH (in situ) | ----do---- | 0.1:1:1 | 15 | About −75 | ----do---- | 83.5 |
| NaNH$_2$ | Trichloromethane and benzaldehyde. | 1:1:1 | 4 | About −75 | Trichloromethylbenzylalcohol | 32 |
| NaNH$_2$ | Trichloromethane and acrylonitrile. | 1:2:1 | 2 | About −75 | α-trichloromethyl propionitrile | 5 |
| NaOH (in situ) | ----do---- | 0.3:2:1 | 15 | About −75 | ----do---- | 61.5 |
| LiOH (in situ) | Trichloromethane and methylmethacrylate. | 1:2:1 | 4 | About −75 | α-trichloromethyl-methyl butyrate | 18 |

NOTE.—A = catalyst. B = trichloromethane. C = organic compound having a polarized double bond.

*Example III*

To liquid ammonia containing sodium amide (0.1 mol) and prepared in an analogous manner to that described in Example II was added a mixture of tribromomethane (0.1 mol, 25.3 grams) and acetone (0.5 mol, 29 grams). The reaction was permitted to continue for about 2 minutes after which time ammonium chloride (9 grams) was added to neutralize the reaction product mixture. Liquid ammonia was then evaporated from the reaction product mixture and the resulting residue was dissolved in diethyl ether and filtered. The diethyl ether and unreacted tribromomethane were evaporated from the filtrate and the resulting residue poured into water. A crystalline precipitate was formed. The precipitate was recovered from the water and identified as 2-tribromoethyl-2-propanol, obtained in 33 percent yield.

The foregoing examples are illustrative of the present invention. Other embodiments within the spirit and scope of the invention will readily present themselves to one skilled in the art.

I claim:

1. A method for trihalomethylation of an organic compound having at least one polarized double bond, said organic compound being selected from the group consisting of hydrocarbyl aldehydes and ketones, methyl and ethyl esters of α,β-unsaturated hydrocarbyl carboxylic acids, and α,β-unsaturated hydrocarbyl nitriles which comprises contacting a trihalomethane selected from the group consisting of trichloromethane, tribromomethane and triiodomethane with said organic compound in liquid ammonia at a temperature below about −10° C. and in the presence of a strong base in an amount ranging from about 0.01 mole to about 2 moles of said strong base per mole of trihalomethane.

2. The method of claim 1 wherein said trihalomethylation is effected at atmospheric pressure.

3. The method of claim 1 wherein said organic compound is a hydrocarbyl aldehyde.

4. The method of claim 1 wherein said organic compound is a hydrocarbyl ketone.

5. The method of claim 1 wherein said organic compound is a methyl ester of α,β-unsaturated hydrocarbyl carboxylic acid.

6. The method of claim 1 wherein said organic compound is an α,β-unsaturated hydrocarbyl nitrile.

7. The method of claim 1 wherein said strong base is selected from the group consisting of an alkali metal hydroxide, an alkali earth metal hydroxide, an alkali metal amide, an alkali earth metal amide, and an alkali metal alkoxide.

8. The method of claim 1 wherein said trihalomethane is trichloromethane.

9. The method of claim 1 wherein said trihalomethane is tribromomethane.

10. The method of claim 1 wherein said trihalomethane is triiodomethane.

References Cited by the Examiner

UNITED STATES PATENTS 2,379,097   6/1945   Niederhauser et al. __ 260—465.7
2,462,389   2/1949   Harrington _____ 260—633

FOREIGN PATENTS 587,275   4/1947   Great Britain.

OTHER REFERENCES

Weizmann et al., J.A.C.S. 70, 1948, pages 1189–1191.
Ekeley et al., J.A.C.S. 46, 1924, pp 1252–1254.
Howard, J.A.C.S. 47, 1925, pp. 455–456.
Howard et al., J.A.C.S. 57, 1935, pp. 376–377 and pp. 2317–2318.
Howard et al., J.A.C.S. 60, 1938, pp. 228–229.

LEON ZITVER, *Primary Examiner.*

CHARLES B. PARKER, *Examiner.*

J. P. BRUST, T. G. DILLAHUNTY,
*Assistant Examiners.*